United States Patent [19]

Mordarski et al.

[11] 4,199,404
[45] Apr. 22, 1980

[54] HIGH PERFORMANCE NUCLEAR FUEL ELEMENT

[75] Inventors: Walter J. Mordarski, Wallingford; Sylvester T. Zegler, West Simsbury, both of Conn.

[73] Assignee: Combustion Engineering, Inc., Windsor, Conn.

[21] Appl. No.: 822,115

[22] Filed: Aug. 5, 1977

[51] Int. Cl.² ............................................. G21C 3/02
[52] U.S. Cl. ...................................... 176/66; 176/68; 176/91 R
[58] Field of Search ................... 176/66, 67, 68, 91 R, 176/91 SP, 73; 264/0.5

[56] References Cited

U.S. PATENT DOCUMENTS

| | | |
|---|---|---|
| 2,934,482 | 4/1960 | Brooks . |
| 3,049,486 | 8/1962 | Currier, Jr. et al. . |
| 3,109,797 | 11/1963 | Maxwell . |
| 3,125,760 | 3/1964 | Foster et al. ...................... 176/66 X |
| 3,141,829 | 7/1964 | Fortescue et al. . |
| 3,156,747 | 11/1964 | Burke ................................... 264/0.5 |
| 3,240,680 | 3/1966 | Laithwaitte et al. . |
| 3,274,068 | 9/1966 | Koutz et al. . |
| 3,285,825 | 11/1966 | Jens . |
| 3,389,054 | 6/1968 | Kovacic ............................... 176/66 X |
| 3,404,200 | 10/1968 | Burgess .................................. 264/0.5 |
| 3,404,201 | 10/1968 | Braun et al. .......................... 264/0.5 |
| 3,421,979 | 1/1969 | Linning . |
| 3,494,785 | 2/1970 | Barr et al. ....................... 176/91 SP X |
| 3,669,832 | 6/1972 | Boettcher . |
| 3,806,565 | 4/1974 | Langrod ............................... 176/66 X |
| 3,813,344 | 5/1974 | Krauth et al. . |
| 3,883,623 | 5/1975 | Lay ........................................ 264/0.5 |

FOREIGN PATENT DOCUMENTS 821297 8/1957 United Kingdom .

Primary Examiner—Peter A. Nelson

[57] ABSTRACT

A fuel-pellet composition for use in fast breeder reactors. Uranium carbide particles are mixed with a powder of uranium-plutonium carbides having a stable microstructure. The resulting mixture is formed into fuel pellets. The pellets thus produced exhibit a relatively low propensity to swell while maintaining a high density.

6 Claims, 1 Drawing Figure

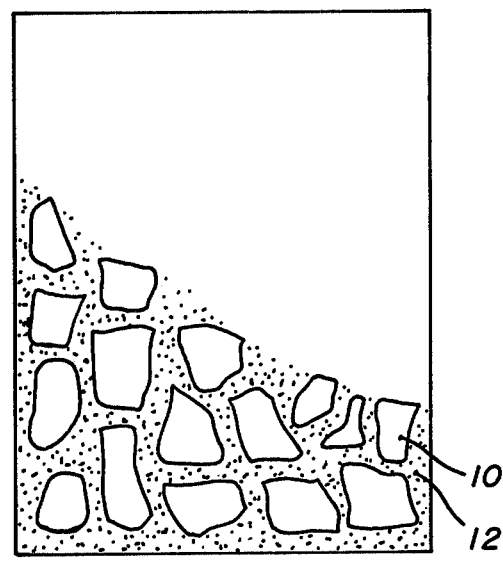

HIGH PERFORMANCE NUCLEAR FUEL ELEMENT

BACKGROUND OF THE INVENTION

The present invention relates to the fuel-bearing "seed" core of a fast breeder reactor, and in particular to the specific composition and structure of fuel pellets for use in the core.

Breeder reactors produce energy from fission reactions in fissionable material. At the same time, excess neutrons that are not used to maintain the energy-releasing nuclear reaction are used to transmute fertile material into fissionable material. For instance, fertile uranium 238 atoms that absorb neutrons produced by a plutonium fission could ultimately be transformed by the neutron captures into fissionable plutonium atoms. Accordingly, the fuel pellets of the seed region are typically made of fissionable plutonium mixed with fertile uranium. Since the power output of each fuel pellet is determined to a large extent by the amount of fissionable material in the pellet, and since the ability of the pellet to transfer its heat to a coolant is dependent upon its surface area, it is necessary to dilute the fissionable plutonium with fertile uranium so that the individual pellets will have a high enough mass-to-surface-area ratio to make them a manageable size. In order to strike a balance between maintaining a relatively long refueling interval and keeping the fuel inventory from becoming too large, this dilution typically results in a ratio of fertile atoms to fissile atoms of between about 4:1 and about 9:1.

It is important in any heat-transfer system that the temperature difference between the heating medium and the cooling medium be high enough to effect an efficient transfer of energy. As a result, it is desirable for the fuel in a reactor to be relatively hot. However, uranium and, especially, plutonium have fairly low melting points, so they are not used in their pure form. They are chemically combined with oxygen, nitrogen, silicon, or carbon, for instance, to convert them into ceramics that have high resistances to heat. In order to achieve a neutron efficiency high enough to obtain a breeding gain without building a prohibitively large core, the fuel should be made of a ceramic that is as dense as possible. For this reason carbide fuels have been of interest, because they are more dense than the oxide fuels typically used. If the density of the carbide fuels can be used to advantage, a breeding gain will be achieved with a cofre of smaller size than would be required for an oxide core. It is a feature of the carbide fuels, however, that they tend to be subject to swelling. This is a problem because the ceramic pellets are loaded into rods made of a thin metal cladding, which could easily be pierced by an expanding fuel pellet. Accordingly, carbide fuels make it necessary that a larger gap be left in the rod to permit the pellets to expand. This gap detracts from the overall density of the core, so some of the advantage gained by the increased density of the carbide fuel is lost by the provision of extra space in the fuel elements. In addition, a larger gap increases the probability that particles of cracked pellets will lodge between the pellets and the clad, thereby tending to cause failed fuel.

Since it has been determined that a significant portion of the swelling in carbide-fuel pellets is caused by gaseous fission products that are trapped within the pellets, it has been proposed to make the pellets of porous material, thereby giving the gaseous fission products a means of escaping the pellet. Again, however the solution has a density penalty that is higher than is desirable.

SUMMARY OF THE INVENTION

The present invention, therefore, provides a pellet construction that reduces swelling with a minimum of density penalty. It is an improvement in fuel pellets of the type that consist essentially of fertile and fissile components. According to the invention, 90 percent or more of the fissile material is contained in a powder having a stable microstructure and a density less than about 85 percent of theoretical. This allows the fission-product gases to escape. To make up for the low density of the powder, at least half of the fertile material is contained in particles having diameters greater than about 50 microns and individual densities averaging more than about 95 percent of theoretical. The pellet is a pressed mixture of the particles and the powder. It has a relatively high density due to the density of the particles and a relatively low swelling rate because the fissile matter is in a powder that permits escape of fission gases.

BRIEF DESCRIPTION OF THE DRAWING

These and other features and advantages of the invention are described with reference to the attached drawing, which shows the structure of the pellet material used in a pellet fabricated according to the teachings of the present invention.

DETAILED DESCRIPTION OF THE PREFERRED EMBODIMENT

FIG. 1 shows an enlarged view of a very small portion of a fuel pellet made according to the present invention. Area 10 is a relatively high-density (greater than about 95 percent of theoretical) uranium carbide particle. Fabrication and surface-area consideration dictate that the particle size, on the average, be greater than around 50 microns. This particulate region contains depleted or naturally occurring uranium. According to the invention, any fertile material, such as uranium-238 silicide, uranium-238 nitride, or uranium-238 oxide, can make up the particles. Since carbide fuels are noted both for high density and high swelling rate and are of interest in the American fast-breeder effort, it is thought that the beneficial characteristics of the invention will be exhibited most advantageously in a carbide fuel, so carbide is chosen for the preferred embodiment.

In addition to the fertile component, fissionable uranium is also present in the particles because natural, and even depleted, uranium always has some $U^{235}$ in it. For that matter, fissionable plutonium or other materials could be included in the particles; according to the invention, as much as 10 percent of the fissile content of the pellet may be contained in the particles. However, the advantages of the present invention are greatest when the fissile component of the particles is kept low, since it is desired that gaseous fission products not be produced in quantity in the high-density regions of the fuel.

Uranium carbide in this particulate form makes up between 60 percent and 90 percent of the total volume of the pellet in the preferred embodiment. The remainder of the pellet, between 10 percent and 40 percent by volume, is made of uranium-238-plutonium carbide, a fissile-fertile blend, in the form of a low-density powder 12 having a stable microstructure. The powder is, by methods known to the art, to have a surface area fabricated greater than about 0.5 m²/g. This insures an interconnected pore structure that will allow the fission gases to escape. The powder must be fine enough to fill in between the particles in a manner similar to that in which mortar fills in between bricks, because this will allow a relatively homogeneous particle-powder mixture. This is among the reasons why the particle size is specified as being greater than about 50 microns; a smaller particle size could result in too great a surface area to be covered by the powder.

According to the invention, the density of the powder is less than 85 percent of theoretical density and contains 90 percent or more of the fissile material. In the preferred embodiment some fertile component is also included in the powder because the melting point of pure plutonium carbide is low and tends to decrease as the fuel is burned up. The addition of uranium both increases the melting point and decreases the effect of burn-up. In order to keep the sintering and temperature-dependent properties of the powder similar to those of a uranium ceramic powder, the fissile-component percentage of the powder should be less than about 40 percent, but to maintain a high enough total-pellet density, the percentage should be above 20 percent. The preferable percentage range is 25 percent to 35 percent.

The addition of uranium also increases the amount of powder in the pellet, which is desirable because the powder has a greater tendency than the particles do to give under pressure, so the tendency of pellet chips to damage the clad is reduced. Another advantage of the fertile-fissile blend is that the uranium content, together with the stable microstructure, reduces the amount of diffusion of plutonium into the high-density uranium region and the diffusion of the uranium from the high-density region to the low-density region during use of the fuel. Thus, a fissile-fertile blend is preferred for the powder.

It is to be noted that the term blend is used. This is because blend is thought to have no definite chemical meaning, and it can therefore be defined, for present purposes, to refer to a structure having a crystal structure like that of the fertile component (uranium-238 carbide) with some of the fertile atoms ($U^{238}$) being replaced by fissile atoms (Pu). Such a structure has been described by several terms, such as alloy, solid solution, and even mixture, but it is thought that each of these terms may be chemically incorrect. The term blend is therefore used for want of a definitely correct term.

Since it is necessary for the fission gases to escape, it is a requirement that the powder have a stable microstructure. This means that the pores must remain in the fuel during burnup. Experience in the art of fabricating fuel for conventional reactors has taught methods of producing fuels having stable microstructures, and successful practice of the present invention requires that now-conventional techniques for guaranteeing a stable microstructure be employed in the fabrication of the fuel pellets.

The particles are generally made by agglomerating the fertile material, produced as a highly sinterable powder, into particles greater that about 50 microns in diameter. "Burnt" (not highly sinterable) powders of fertile-fissile material are mixed to a high degree of homogenity with the agglomerated fertile particles. This mixture is then pressed into pellets and sintered. The process is arranged to produce a pellet structure containing high-density particles of fertile material dispersed in a low-density powder of fertile-fissile material having a stable microstructure. It is possible for experienced practitioners of this art to arrange the process so that the particulate fertile-material regions have densities greater than about 95 percent of theoretical, while the powder regions have densities below about 85 percent.

Through the use of the fuel pellet of the present invention, maximum effect can be given to the density of carbide fuels, and an associated decrease in cladding damage can be effected.

What is claimed is:

1. In a breeder-reactor fuel pellet of the type formed by compressing and sintering a blend of fissile and fertile components and loaded into fuel rods of a thin metal cladding, the improvement wherein:
    a. at least 90 percent of the fissile component content of the fuel pellet is contained in a powder consisting essentially of a blend of fissile and fertile components having a fissile-component percentage between 20 and 40 percent, the powder having a stable microstructure and a density less than about 85 percent of theoretical; and
    b. at least half of the fertile component content of the fuel pellet is contained in particles greater than about 50 microns in diameter, the average of the individual densities of the particles being greater than about 95 percent of theoretical.

2. A pellet as recited in claim 1, wherein the ratio of fertile atoms to fissile atoms is between 4:1 and 9:1.

3. A pellet as recited in claim 2, wherein the powder consists essentially of a blend of fertile and fissile components having a fissile-component percentage between 25 percent and 35 percent.

4. A pellet as recited in claim 3, wherein the powder consists essentially of a fertile-fissile blend selected from the group consisting of uranium-plutonium carbide, uranium-plutonium nitride, uranium-plutonium silicide, and uranium-plutonium oxide.

5. A pellet as recited in claim 3, wherein the particles consist essentially of a fertile material selected from the group consisting of uranium carbide, uranium nitride, uranium silicide, and uranium oxide.

6. A pellet as recited in claim 4, wherein the powder consists essentially of uranium-plutonium carbide and the particles consist essentially of uranium carbide.

* * * * *

UNITED STATES PATENT OFFICE
CERTIFICATE OF CORRECTION

Patent No. 4,199,404　　　　　　　　Dated April 22, 1980

Inventor(s) MORDARSKI ET AL

It is certified that error appears in the above-identified patent and that said Letters Patent are hereby corrected as shown below:

Column 3, lines 15 - 16, cancel "In the preferred embodiment some fertile component is" and insert --Some fertile material is--.

Column 3, line 38, change "preferred" to --required--.

Column 1, line 50, change "cofre" to --core--.

Signed and Sealed this

Seventh Day of October 1980

[SEAL]

*Attest:*

SIDNEY A. DIAMOND

*Attesting Officer*　　　　　*Commissioner of Patents and Trademarks*